(12) United States Patent
Ballard

(10) Patent No.: US 8,377,853 B2
(45) Date of Patent: *Feb. 19, 2013

(54) AQUEOUS GELS FOR WELL BORE STRENGTHENING

(75) Inventor: David Ballard, Aberdeenshire (GB)

(73) Assignee: M-I L.L.C., Houston, TX (US)

( * ) Notice: Subject to any disclaimer, the term of this patent is extended or adjusted under 35 U.S.C. 154(b) by 280 days.

This patent is subject to a terminal disclaimer.

(21) Appl. No.: 11/737,612

(22) Filed: Apr. 19, 2007

(65) Prior Publication Data

US 2007/0249504 A1 Oct. 25, 2007

Related U.S. Application Data

(60) Provisional application No. 60/793,407, filed on Apr. 20, 2006.

(51) Int. Cl.
| | |
|---|---|
| *C09K 8/68* | (2006.01) |
| *C09K 8/60* | (2006.01) |
| *C09K 8/588* | (2006.01) |
| *E21B 43/26* | (2006.01) |
| *E21B 33/00* | (2006.01) |

(52) U.S. Cl. ........ 507/203; 507/207; 507/221; 507/261; 166/305.1; 166/285

(58) Field of Classification Search .................. 507/207, 507/215, 221, 261, 203, 270; 166/305.1, 166/285, 294

See application file for complete search history.

(56) References Cited

U.S. PATENT DOCUMENTS

| | | | | |
|---|---|---|---|---|
| 3,672,817 | A | | 6/1972 | Falkehag et al. |
| 4,001,205 | A | | 1/1977 | Buehler et al. |
| 4,168,371 | A | | 9/1979 | Brown et al. |
| 4,244,728 | A | | 1/1981 | DelliColli et al. |
| 4,440,228 | A | * | 4/1984 | Swanson ............... 166/272.2 |
| 4,950,698 | A | * | 8/1990 | Shu et al. ............... 523/130 |
| 5,104,912 | A | | 4/1992 | Hoskin |
| 5,128,390 | A | | 7/1992 | Murphey et al. |
| 5,134,176 | A | * | 7/1992 | Shu .................. 523/130 |
| 5,213,446 | A | * | 5/1993 | Dovan ............... 405/129.3 |
| 5,609,209 | A | * | 3/1997 | Shu .................. 166/295 |
| 5,875,846 | A | * | 3/1999 | Chatterji et al. ......... 166/293 |
| 5,911,282 | A | * | 6/1999 | Onan et al. ............ 175/72 |
| 6,156,819 | A | | 12/2000 | Lai et al. |
| 6,176,315 | B1 | * | 1/2001 | Reddy et al. ........... 166/295 |
| 6,186,231 | B1 | * | 2/2001 | Kalfoglou ............. 166/270 |
| 6,465,397 | B1 | * | 10/2002 | Patterson .............. 507/222 |
| 6,733,559 | B1 | | 5/2004 | Huttermann et al. |
| 2004/0182576 | A1 | * | 9/2004 | Reddy et al. ........... 166/295 |
| 2005/0230113 | A1 | * | 10/2005 | Eoff et al. ............. 166/294 |
| 2006/0211580 | A1 | * | 9/2006 | Wang et al. ............ 507/209 |

FOREIGN PATENT DOCUMENTS

EP 0949311 10/1999

OTHER PUBLICATIONS

PCT International Search Report issued in PCT Application No. PCT/US2007/067123 dated Sep. 20, 2007 (4 pages).
PCT Written Opinion issued in PCT Application No. PCT/US2007/067123 dated Sep. 20, 2007 (6 pages).
Extended European Search Report for Application No. 07761043.4-1218, mailed on Dec. 8, 2009 (8 pages).
Examiner's Report for Australian Patent Application No. 2007240294; dated Feb. 2, 2010 (3 pages).
First Office Action issued in related European Patent Application No. 07761043.4; dated May 21, 2010 (1 page).
Office Action issued in Eurasian Application No. 200870455 dated Jun. 9, 2010 (3 pages).
Office Action issued in European Application No. 07761043.4 dated Oct. 8, 2010 (5 pages).
Office Action issued in Canadian Application No. 2,649,412 dated Dec. 3, 2010 (3 pages).
Office Action issued in corresponding Mexican Application No. MX/a/2008/013319 dated Feb. 21, 2011 (8 pages).
Office Action issued in corresponding Eurasian Application No. 200870455 dated Mar. 10, 2011 (4 pages).
Office Action issued in the corresponding Australian Application No. 2007240294 dated May 10, 2011 (2 pages).
Office Action issued in corresponding Canadian Application No. 2,649,412 dated Nov. 1, 2011 (2 pages).
Office Action issued in the corresponding Mexican Application No. MX/2011/029897 dated Aug. 25, 2011 (5 pages).
Office Action issued in corresponding European Application No. 07761043.4-1218 dated Aug. 30, 2011 (4 pages).
Office Action issued in corresponding Australian Application No. 2007240294 dated Sep. 26, 2011 (2 pages).

* cited by examiner

*Primary Examiner* — Ling Choi
*Assistant Examiner* — Aiqun Li
(74) *Attorney, Agent, or Firm* — Osha • Liang LLP

(57) ABSTRACT

A process for treating an earth formation is disclosed, the process may include: injecting a gelling agent into the earthen formation; injecting a crosslinking agent into the earthen formation; and reacting the gelling agent and the crosslinking agent to form a gel. The gelling agent may include at least one of a lignin, a lignosulfonate, a tannin, a tannic acid, a modified lignin, a modified lignosulfonate, a modified tannin, a modified tannic acid, biopolymers, starches, carboxy methyl cellulose, polyacrylates, polyacrylamides, polyamines, polyether amines, poly vinyl amines, polyethylene imines, and combinations thereof. The crosslinking agent may include at least one of ethylene glycol diglycidyl ether, propylene glycol diglycidyl ether, butylene glycol diglycidyl ether, sorbitol polyglycidyl ether, trimethylolpropane triglycidyl ether, sorbitol polyglycidyl ether, diglycidyl ether of neopentyl glycol, epoxidized 1,6-hexanediol, aziridine derivatives, epoxy functionalized polyalkalene glycols, an oxidized starch, a polymeric dialdehyde, an aldehyde adduct, a tetra methoxy propane, a hydrolized acetal, and combinations thereof.

8 Claims, No Drawings

AQUEOUS GELS FOR WELL BORE STRENGTHENING

CROSS-REFERENCE TO RELATED APPLICATION

This application claims priority to U.S. Provisional Patent Application No. 60/793,407, filed Apr. 20, 2006, the disclosure of which is incorporated herein by reference.

BACKGROUND OF INVENTION

1. Field of the Invention

Embodiments disclosed herein relate generally to lignin, lignosulfonate, tannin, and tannic acid gels. In some embodiments, the gels are formed by reacting a low- or non-toxic crosslinking agent with lignin, lignosulfonate, or other gelling agents.

2. Background

Lost circulation is a recurring drilling problem, characterized by loss of drilling mud into downhole formations that are fractured, highly permeable, porous, cavernous, or vugular. These earth formations can include shale, sands, gravel shell beds, reef deposits, limestone, dolomite, and chalk, among others. Other problems encountered while drilling and producing oil and gas include stuck pipe, hole collapse, loss of well control, and loss of or decreased production. In attempting to cure these and other problems, crosslinkable or absorbing polymers, loss control material (LCM) pills, and cement squeezes have been employed, each of which may include materials such as lignins and lignosulfonates, as well as lignin and lignosulfonate gels.

Lignin is a by-product of the sulfite process of making paper, and when combined with sodium dichromate, forms an insoluble gel after a short time. Lignin-based grouts or gels can be used in porous earth formations for decreasing the flow of water through the formation, or for increasing the load-bearing capacity of the formation. Lignin grouts have also been used effectively in sealing fine fissures in fractured rock or concrete.

In addition to sodium bichromate, other crosslinking agents used in forming lignin-based gels include potassium bichromate, ferric chloride, sulfuric acid, aluminum sulfate (alum), aluminum chloride, ammonium persulfate, and copper sulfate. The bichromates have been the most widely used and are the most satisfactory, as they return a gel having a desired strength.

Lignosulfonate gels have also been used in gel treatments, such as to reduce channeling of solvent and water through drilling formations. In particular, chrome-lignosulfonate time-set gels have been found to be successful in forming an in-situ time-set gel. For example, see Wagner et al., "Field application of lignosulfonate gels to reduce channeling, South Swan Hills Miscible Unit, Alberta, Canada," SPE 15547, 1986.

U.S. Pat. Nos. 3,672,817 and 4,001,205 disclose processes for producing a dispersant by reacting a water-soluble sulfonated lignin and epichlorohydrin. U.S. Pat. No. 4,168,371 discloses a process for making lignin-based gels by reacting a water-insoluble lignin and epichlorohydrin, where the reaction is catalyzed by an alkali metal hydroxide. U.S. Pat. No. 4,244,728 discloses a process for producing a crosslinked lignin gel which is the reaction product of an aqueous solution of alkali lignin with a crosslinking agent such as formaldehyde, glyoxal, or glutaric dialdehyde.

Lignin and lignosulfonate gels formed with bichromates, epichlorohydrin, and aldehydes, however, are no longer environmentally acceptable due to the toxicity of the chromium, aldehyde, and epichlorohydrin crosslinking agents. Unfortunately, other reactants may not result in a gel of equivalent strength as when these crosslinking agents are used. For example, lignin gels formed from ammonium persulfate generally have a strength approximately 40 percent of that of a similar grout mixture in which bichromate is used as a reactant.

Accordingly, there exists a need for lignin-based and lignosulfonate-based gels formed from less toxic or non-toxic crosslinking agents, and for gels that have equivalent or greater strength than those formed from epichlorohydrins, bichromates or other chromium catalysts, and other toxic crosslinking agents.

SUMMARY OF INVENTION

In one aspect, embodiments disclosed herein relate to a process for stengthening a wellbore. The process may include: injecting a gelling agent into the earthen formation; injecting a crosslinking agent into the earthen formation; and reacting the gelling agent and the crosslinking agent to form a gel. The gelling agent may include at least one of a lignin, a lignosulfonate, a tannin, a tannic acid, a modified lignin, a modified lignosulfonate, a modified tannin, a modified tannic acid, biopolymers, starches, carboxy methyl cellulose, polyacrylates, polyacrylamides, polyamines, polyether amines, poly vinyl amines, polyethylene imines, and combinations thereof. The crosslinking agent may include at least one of ethylene glycol diglycidyl ether, propylene glycol diglycidyl ether, butylene glycol diglycidyl ether, trimethylolpropane triglycidyl ether, sorbitol polyglycidyl ether, diglycidyl ether of neopentyl glycol, epoxidized 1,6-hexanediol, aziridine derivatives, epoxy functionalized polyalkalene glycols, an oxidized starch, also known as polymeric dialdehyde, an aldehyde adduct, a tetra methoxy propane, a hydrolized acetal, and combinations thereof.

In another aspect, embodiments disclosed herein relate to a gel formed from a crosslinking agent and a gelling agent. The gelling agent may include at least one of a lignin, a lignosulfonate, a tannin, a tannic acid, a modified lignin, a modified lignosulfonate, a modified tannin, a modified tannic acid, biopolymers, starches, carboxy methyl cellulose, polyacrylates, polyacrylamides, polyamines, polyether amines, poly vinyl amines, polyethylene imines, and combinations thereof. The crosslinking agent may include at least one of ethylene glycol diglycidyl ether, propylene glycol diglycidyl ether, trimethylolpropane triglycidyl ether, diglycidyl ether of neopentyl glycol, epoxidized 1,6-hexanediol, butylene glycol diglycidyl ether, aziridine derivatives, epoxy functionalized polyalkalene glycols, an oxidized starch, also known as polymeric dialdehyde, an aldehyde adduct, a tetra methoxy propane, a hydrolized acetal, and combinations thereof.

In another aspect, embodiments disclosed herein relate to a method of treating an earth formation. The method may include injecting an aqueous gel into an earth formation, the aqueous gel comprising at least one gelling agent and at least one crosslinking agent dissolved in an aqueous solution and having an initial viscosity in the range of approximately 500 centipoise to 100,000 centipoise measured at 20° C. using an RV2 spindle at low rotational speeds (12 rpm or less), and allowing the aqueous gel to react in the earth formation.

Other aspects and advantages of the invention will be apparent from the following description and the appended claims.

DETAILED DESCRIPTION

In one aspect, embodiments disclosed herein relate to gels formed from lignins, lignosulfonates, tannins, tannic acid, and other gelling agents. In other aspects, embodiments disclosed herein relate to processes for making gels, and applications in which the gels disclosed herein may be useful.

A crosslinking agent and a gelling agent (the material to be crosslinked) may be reacted to form a gel. In some embodiments, the gelling agent may be dissolved in water to form a solution, and a crosslinking agent may be added to the solution, reacting with the gelling agent to form a gel. In other embodiments, the pH of the solution may be adjusted to effect or enhance gel formation.

Gelling Agents/Materials to be Crosslinked

In some embodiments, gelling agents, or the materials to be crosslinked, may include lignins, lignosulfonates, tannins, tannic acids, and combinations thereof. In other embodiments, materials to be crosslinked may include modified lignins, modified lignosulfonates, modified tannins, modified tannic acids, and combinations thereof. In certain embodiments, tannins may be modified to have a higher phenol content. In certain other embodiments, tannins may be treated with amines.

In other embodiments, gelling agents may include biopolymers, starches, carboxy methyl cellulose, polyacrylates, polyacrylamides, and combinations thereof. In other embodiments, gelling agents may include polyamines such as diethylene triamine and triethylene tetramine, and the like. In yet other embodiments, gelling agents may include polyether amines, poly vinyl amines and polyethylene imines.

In some embodiments, starches may include natural starches, chemically modified starches, and mixtures of one or more natural and/or chemically modified starches. Natural starches may include those of potato, wheat, tapioca, rice, corn, and roots having a high starch content, among others. Chemically modified starches may include carboxymethyl starch, hydroxyethyl starch, hydroxypropyl starch, acetate starch, sulfamate starch, phosphate starch, and nitrogen modified starch, among others.

In yet other embodiments, combinations of any of the above listed materials to be crosslinked may be used.

Cross-Linking Agents

The desired gel may be achieved by reacting the above gelling agents and a crosslinking agent. In some embodiments, the crosslinking agent may include ethylene glycol diglycidyl ether, propylene glycol diglycidyl ether, butylene glycol diglycidyl ether, sorbitol polyglycidyl ether, aziridine derivatives, epoxy functionalized polyalkalene glycols, an oxidized starch (polymeric dialdehyde), and combinations thereof.

In other embodiments, the crosslinking agent may include an acetal that can be hydrolized to produce the aldehyde in situ. For example, the crosslinking agent may include an aldehyde adduct, a tetra methoxy propane, or the bisulphite addition compounds of the aldehydes. For example, a formaldehyde adduct may be formed by reacting formaldehyde and a compound selected from sulfurous acid and its water soluble salts, such as the alkali metal salts (e.g., sodium or potassium salts). In one embodiment, the salt used may be sodium bisulfite. In addition to using the alkali metal salts, ammonium and tertiary amine salts of sulfurous acid such as ammonium bisulfite or trimethylamine sulfite may be used to form an adduct.

In other embodiments, the crosslinking agent may be a diepoxide or a triepoxide. In yet other embodiments, the crosslinking agent may include trimethylolpropane triglycidyl ether, diglycidyl ether of neopentyl glycol, epoxidized 1,6-hexanediol, 1,4-butanediol diglycidyl ether (BDDGE), 1,2,7,8-diepoxyoctane, 3-(bis(glycidoxymethyl)-methoxy)-1,2-propanediol, 1,4-cyclohexanedimethanol diglycidyl ether, 4-vinyl-1-cyclohexene diepoxide, 1,2,5,6-diepoxycyclooctane, and bisphenol A diglycidyl ether, or combinations thereof.

Gel Preparation

In one embodiment, the gel is formed by combining a gelling agent and a crosslinking agent in an aqueous solution. Aqueous solutions that may be appropriate include water-based muds for use in downhole applications and may include fresh water, sea water, brine, mixture of water and water soluble organic compounds, and mixtures thereof.

The crosslinking agent may be present in an amount effective to crosslink the gelling agent. In some embodiments, the crosslinking agent may be used in an amount ranging from about 0.05 to about 50 weight percent based on the total weight of the gelling agent(s). In other embodiments, the crosslinking agent may be used in an amount ranging from about 5 to about 40 weight percent based on the total weight of the gelling agent(s); from about 10 to about 35 weight percent in yet other embodiments. In other embodiments, a weight ratio of the crosslinking agent to the gelling agent may be from 1:2000 to 1:1; from 1:20 to 1:2 in other embodiments, and from 1:10 to about 1:3 in yet other embodiments.

The amount of crosslinking agent may affect the hardness of the resulting gel. For example, in some embodiments, for a constant weight of gelling agent, increasing the amount of crosslinking agent may result in a higher crosslink density, and therefore a harder gel. Using the guidelines provided herein, those skilled in the art will be capable of determining a suitable amount of cross-linking agent to employ to achieve a gel of the desired hardness.

Aging Temperature

In some embodiments, the gelling agent and the crosslinking agent may be reacted at a temperature from −50 to 300° C. In other embodiments, the gelling agent and the crosslinking agent may be reacted at a temperature from 25 to 250° C.; from 50 to 150° C. in other embodiments; and from 60 to 100° C. in yet other embodiments. In certain embodiments, the reaction temperature determines the amount of time required for gel formation.

Time Required for Gel Formation

Embodiments of the gels disclosed herein may be prepared by combining a gelling agent and a crosslinking agent in an aqueous solution. In some embodiments, a gel may form immediately upon mixing the gelling agent and the crosslinking agent. In other embodiments, a gel may form within 1 minute of mixing; within 5 minutes of mixing in other embodiments; within 30 minutes of mixing in other embodiments. In some embodiments, a gel may form within 1 hour of mixing; within 8 hours in other embodiments; within 16 hours in other embodiments; within 80 hours in other embodiments; within 120 hours in yet other embodiments.

pH

In some embodiments, the gelling agent and the crosslinking agent may be reacted in a medium having a pH greater than 4. In other embodiments, the gelling agent and the crosslinking agent may be reacted in a medium having a pH greater than 6; a pH greater than 7 in other embodiments; a pH greater than 8 in other embodiments; a pH greater than 9 in yet other embodiments.

Reagents which may be used to adjust the pH may include alkali metal hydroxides, such as sodium hydroxide, potassium hydroxide, calcium hydroxide, and rubidium hydroxide, lithium hydroxides, benzyltrimethylammonium hydroxides, and the partially neutralized salts of organic acids, such as tri-sodium ethylenediaminetetraacetic acid. In some embodiments, the alkali metal hydroxide, pH adjusting agent, or buffer, may act as a catalyst, effecting or enhancing the crosslinking reaction between the gelling agent and the crosslinking agent.

Water Concentration

In some embodiments, a solution of gelling agent(s) and crosslinking agent(s) in water may initially have a varied viscosity to obtain a desired degree of flow sufficient for decreasing the flow of water through or increasing the load-bearing capacity of a formation. The viscosity of the solution may be varied by increasing or decreasing the amount of water relative to the crosslinking and gelling agents, by employing viscosifying agents, or by other techniques common in the art.

In some embodiments, the combined amount of gelling agents and crosslinking agents may range from 0.5 to 100 weight percent, based upon the total weight of water in the solution. In other embodiments, the combined amount of gelling agents and crosslinking agents may range from 5 to 100 weight percent, based upon the total weight of water in the solution; from 20 to 70 weight percent in other embodiments; from 25 to 65 weight percent in yet other embodiments. As used herein, total weight of water is exclusive of any additional water added with pH adjusting reagents.

The gelling agent and the crosslinking agent may react to form gel beads. For example, in some embodiments, bead formation may be effected by agitation of the solution. In other embodiments, bead formation may be effected by forming an emulsion or suspension of the reactants in water. In certain embodiments, an emulsion or suspension may be formed using an organic solvent, emulsifying agents, or combinations thereof.

Hardness

The reaction of the gelling agent and the crosslinking agent may produce gels having a consistency ranging from a viscous sludge to a hard gel. In some embodiments, the reaction of the gelling agent and the crosslinking agent may result in a soft elastic gel. In other embodiments, the reaction may result in a firm gel; in a hard gel in yet other embodiments. The hardness of the gel is the force necessary to break the gel structure, which may be quantified by measuring the force required for a needle to penetrate the crosslinked structure. Hardness is a measure of the ability of the gel to resist to an established degree the penetration of a test needle driven into the sample at a constant speed.

Hardness may be measured by using a Brookfield QTS-25 Texture Analysis Instrument. This instrument consists of a probe of changeable design that is connected to a load cell. The probe may be driven into a test sample at specific speeds or loads to measure the following parameters or properties of a sample: springiness, adhesiveness, curing, breaking strength, fracturability, peel strength, hardness, cohesiveness, relaxation, recovery, tensile strength burst point, and spreadability. The hardness may be measured by driving a 2.5 mm diameter, cylindrical, flat faced probe into the gel sample at a constant speed of 30 mm per minute. When the probe is in contact with the gel, a force is applied to the probe due to the resistance of the gel structure until it fails, which is recorded via the load cell and computer software. As the probe travels through the sample, the force on the probe and the depth of penetration are measured. The force on the probe may be recorded at various depths of penetration, such as 20, 25, and 30 mm, providing an indication of the gel's overall hardness. For example, the initial peak force may be recorded at the point the gel first fails, close to the contact point, followed by recording highest and lowest values measured after this point where the probe is travelling through the bulk of the gel.

In some embodiments, the resulting gel may have a hardness value from 2 to 20000 gram-force. In other embodiments, the resulting gel may be a soft elastic gel having a hardness value in the range from 2 to 20 gram-force. In other embodiments, the resulting gel may be a firm gel having a hardness value from 20 to 100 gram-force. In other embodiments, the resulting gel may range from bard to tough, having a hardness value from 100 to 20000 gram-force; from 300 to 15000 gram-force in other embodiments; from 500 to 10000 gram-force in yet other embodiments; from 1000 to 6000 gram-force in yet other embodiments.

In other embodiments, the hardness of the gel may vary with the depth of penetration. For example, the gel may have a hardness of 300 gram-force or greater at a penetration depth of 20 mm in some embodiments. In other embodiments, the gel may have a hardness of 1000 gram-force or greater at a penetration depth of 20 mm; 3,000 gram-force or greater at a penetration depth of 20 mm in other embodiments; and 5000 gram-force or greater at a penetration depth of 25 mm in yet other embodiments.

With respect to the variables listed above (i.e. temperature, time, etc.), those having ordinary skill in light of the disclosure will appreciate that, by using the present disclosure as a guide, properties may be tailored as desired.

Viscosity

The viscosity of the gel composition may be affected by the concentrations of one or more of the gelling agent, viscosifier, and solids present in the composition. As the concentrations of the gelling agent, viscosifier, or solids increase, the viscosity of the gel composition will increase. In some embodiments, the concentration of the gelling agent may range from 8-25% by weight. In other embodiments, the concentration of the gelling agent may range from 10-20% by weight. In yet other embodiments, the concentration of the gelling agent may range from 11-17%.

Viscosity may be measured by using a Brookfield DV-II+ Viscometer. One of skill in the art will appreciate that the viscosity measurements will be dependent upon the temperature of the gel composition, the type of spindle, and the number of revolutions per minute. The viscosity ranges disclosed herein were measured at 20° C. using a Brookfield DV-II+ Viscometer with a LV2 spindle. The viscosity may be measured by lowering the viscometer into the center of the sample until the spindle is immersed the middle of the immersion mark. Care should be taken not to trap air under the spindle. The viscometer can be started after adjusting the viscometer to the desired RPM. If more than one RPM is to be used, the viscometer should be started at the lowest desired RPM. This reduces the amount of shear introduced to the sample, resulting in more accurate readings at lower RPM's.

In some embodiments, the mixing of the gelling agent and the crosslinking agent may produce gel compositions having an initial viscosity ranging from approximately 500 centipoise to 20,000 centipoise measured at 20° C. using an LV2 spindle at low rotational speeds (12 rpm or less). In other embodiments, the mixing of the gelling agent and the crosslinking agent may produce gel compositions having an initial viscosity ranging from approximately 1000 centipoise to 5,000 centipoise measured at 20° C. using an LV2 spindle at low rotational speeds (12 rpm or less). As used herein, initial viscosity refers to the viscosity of the composition prior to substantial reaction of the crosslinking agent and gelling agent.

Applications

Some embodiments of the gels disclosed herein may be formed in a one-solution single component system, where the crosslinking agent(s) are premixed with a solution of the gelling agent (material to be crosslinked) immediately prior to placement or injection, thus maximizing the amount of time the composition remains liquid before gel formation. The gel times may be adjusted by changing the quantity of water in the solution. One of skill in the art will appreciate that the gel times may also be adjusted by other formulation variables such as pH. Other embodiments of the gels disclosed herein may also be formed in a two-component system, where one reagent, the crosslinking or gelling agent, may be placed in the wellbore or the near-wellbore region where it may then be contacted by the other reagent, either the crosslinking or gelling agent as required.

Embodiments of the gels disclosed herein may be used in applications including: as an additive in drilling muds; as an additive for enhancing oil recovery (EOR); as one additive in loss circulation material (LCM) pills; wellbore (WB) strengthening treatments; soil stabilization; as a dust suppressant; as a water retainer or a soil conditioner; as hydrotreating (HT) fluid loss additives, and others.

Use in Drilling Muds

Drilling fluids or muds typically include a base fluid (for example water, diesel or mineral oil, or a synthetic compound), weighting agents (for example, barium sulfate or barite may be used), bentonite clay, and various additives that serve specific functions, such as polymers, corrosion inhibitors, emulsifiers, and lubricants. Those having ordinary skill in the art will recognize that a number of different muds exist, and limitations on the present invention is not intended by reference to particular types. During drilling, the mud is injected through the center of the drill string to the drill bit and exits in the annulus between the drill string and the wellbore, fulfilling, in this manner, the cooling and lubrication of the bit, casing of the well, and transporting the drill cuttings to the surface.

The gels disclosed herein may be used as an additive in drilling mud. In some embodiments, the gels may form a filter cake or one component of a filter cake that forms along the wellbore as drilling progresses. The gels contained in the drilling fluid may be deposited along the wellbore throughout the drilling process, potentially strengthening the wellbore by stabilizing shale formations and other sections encountered while drilling. Improved wellbore stability may reduce the occurrence of stuck pipe, hole collapse, hole enlargement, lost circulation, and may improve well control.

Wellbore stability may also be enhanced by the injection of a moderate viscosity mixture of a gelling agent and a crosslinking agent into formations along the wellbore. The mixture may then continue to react, strengthening the formation along the wellbore upon gellation of the mixture.

In other embodiments, the gels disclosed herein may aid in lifting solid debris from tubing walls and through the tubing annulus. Hard gels circulating through the drill pipe during drilling may scrape and clean the drill pipe, removing any pipe scale, mud, clay, or other agglomerations that may have adhered to the drill pipe or drill tubing. In this manner, the drill pipe may be maintained free of obstructions that could otherwise hinder removal of drilled solids from the drill pipe during drilling.

Enhanced Oil Recovery

Embodiments of the gels disclosed herein may be used to enhance secondary oil recovery efforts. In secondary oil recovery, it is common to use an injection well to inject a treatment fluid, such as water or brine, downhole into an oil-producing formation to force oil toward a production well. Thief zones and other permeable strata may allow a high percentage of the injected fluid to pass through only a small percentage of the volume of the reservoir, for example, and may thus require an excessive amount of treatment fluid to displace a high percentage of crude oil from a reservoir.

To combat the thief zones or high permeability zones of a formation, embodiments of the gels disclosed herein may be injected into the formation. Gels injected into the formation may partially or wholly restrict flow through the highly conductive zones. In this manner, the gels may effectively reduce channeling routes through the formation, forcing the treating fluid through less porous zones, and potentially decreasing the quantity of treating fluid required and increasing the oil recovery from the reservoir.

In other embodiments, gels may also be formed in situ within the formation to combat the thief zones. Gelling agents may be injected into the formation, allowing the gelling agents to penetrate further into the formation than if a gel was injected. The crosslinking agents may then be injected, causing the previously injected gelling agents to crosslink within the formation. By forming the gels in situ in the formation, it may be possible to avert channeling that may have otherwise occurred further into the formation, such as where the treatment fluid traverses back to the thief zone soon after bypassing the injected gels as described above.

LCM Pills

As mentioned above, gels disclosed herein may be used as one component in a drilling fluid. The gels may form part of a filter cake, minimizing seepage of drilling fluids to underground formations and lining the wellbore. As another example, embodiments of the gels disclosed herein may be used as one component in loss circulation material (LCM) pills that are used when excessive seepage or circulation loss problems are encountered, requiring a higher concentration of loss circulation additives. LCM pills are used to prevent or decrease loss of drilling fluids to porous underground formations encountered while drilling.

In some embodiments, the crosslinking agent and gelling agent/material may be mixed prior to injection of the pill into the drilled formation. The mixture may be injected while maintaining a low viscosity, prior to gel formation, such that the gel may be formed downhole. In other embodiments, the gelling material and crosslinking agent may be injected into the formation in separate shots, mixing and reacting to form a gel in situ (in the formation following injection of the LCM pill shots). In this manner, premature gel formation may be avoided.

For example, a first mixture containing a gelling agent may be injected into the wellbore and into the lost circulation zone. A second mixture containing a crosslinking agent and/or pH modifier may be injected, causing the gelling agent to crosslink in situ to the point that the gel expands in size. The expanded and hardened gel may plug fissures and thief zones, closing off the lost circulation zone.

Soil Stabilization

Gels described herein may be used as one component of a soil stabilizer. For example, lignosulfonates may be used for stabilizing road base courses and the like. Pulverized soil may be mixed and worked with the stabilizing composition in a single or multiple layer, compacting each layer as it is laid down. The compaction may be by any suitable method such as rubber-tied rollers or sheepsfoot rollers. The amount of stabilizing composition used depends on the type of soil, moisture content and other factors. The exact amount of stabilizing composition and the amount of water dilution vary with soil type, moisture content and other factors.

Dust Suppressant

Gels described herein may also be utilized for dust control, dust suppression, dust palliative treatment, road stabilization and many other dust binding applications. The lignin molecule functions by adsorbing on the substrate and the binding effect results from intermolecular forces between the lignin molecule and the substrate. The lignin molecule is unique as it has several different polar groups and aromatic systems. This increases the affinity of the molecule which results in improved adhesion, and makes it suitable for a wide range of substrates.

The binding property of lignin-based products may be utilized in many types of dust control and dust prevention, such as dust-suppression in roads, parking lots, racing tracks, quarries, paddocks, and construction sites, dust-palliative or dust prevention treatment of public and private roads, road and soil-stabilization of secondary roads and areas, sand dune and earth stabilization on areas to be kept free from dust and wind erosion, and others.

For example, to prevent the loss of road surface fines and prolong the useful driving life of unpaved roads, dust control measures are usually employed before maintenance is required. The primary dust suppressants in use are: water (fresh and sea), chloride compounds, lignin derivatives, and resinous adhesives. When used as dust suppressant, the lignin polymers act as glue binding the soil particles together.

Gels disclosed herein may be used in other processes, including the aforementioned applications such as water retainers, soil conditioners, and hydrotreating (HT) fluid loss additives. It is further contemplated that gels described herein may be useful in other processes and applications known to those skilled in the art.

EXAMPLES

Example 1

Samples 1-4 were prepared from a natural polyphenol powder extract derived from quebracho (Colatan GTH, available from Unitan). Samples 5 and 6 were prepared from a lignosulfonate (Spersene CF, available from MI SWACO®). These gelling agents were crosslinked using either ethylene glycol diglycidyl ether (EGDGE) (available from Sigma Aldrich) or a trifunctional aziridine (trimethylolpropane tris (beta-ethyleniminopropionate) (TMPTEP), available from BASF) as the crosslinking agent, as detailed in Table 1. Comparative Samples 1 and 2 (CS1 and CS2) were prepared from lignosulfonate and quebracho extract crosslinked with sodium dichromate. The amount of natural polyphenol powder extract or lignosulfonate given in Table 1 for each respective sample was mixed with 10 mL water and the respective cross linking agent. The pH of the mixture was adjusted to the desired level using sodium hydroxide (available from Sigma Aldrich). The mixtures were then placed in 25 mL screw top glass vials and aged under static conditions at 70° C. in a temperature controlled fan assisted oven. The solution was observed during the aging process, with the observations as noted in Table 1.

The strength and quality of the resulting gels were measured following the aging process. Hardness is a measure of the ability of the gel to resist to an established degree of the penetration of a test probe connected to a load cell driven at a constant speed into the sample. Hardness was measured by driving a 2.5 mm diameter needle probe into the gel sample at a speed of 30 mm per minute, as described above with reference to the Brookfield Texture Analysis QTS-25 Instrument. The probe was set at a standard start position for the test above the sample in the glass vial. The test was started and the probe was allowed to travel 40 mm penetrating nearly the full depth of the sample in the glass vial. The force on the probe and the depth of penetration were recorded via computer logging software. The results in Tables 1 and 2 present the experimental results for the force on the probe that was recorded at 20, 25, and 30 mm depths of penetration from the initial starting position of the probe.

TABLE 1

| | Sample | | | | | | | |
|---|---|---|---|---|---|---|---|---|
| | 1 | 2 | 3 | 4 | 5 | 6 | CS1 | CS2 |
| Gelling Agent: | | | | | | | | |
| Quebracho extract (g) | 3 | 3 | 5 | 5 | — | — | 3 | — |
| Lignosulphonate (g) | — | — | — | — | 5 | 5 | — | 3 |
| Cross Linking Agent: | | | | | | | | |
| EGDGE | 0.5 | 1 | 0.5 | 1 | 1 | — | — | — |
| TMPTEP | — | — | — | — | — | 0.5 | — | — |
| Sodium Dichromate | — | — | — | — | — | — | 0.5 | 0.5 |
| pH (adjusted with caustic) | 9.5 | 9.5 | 9.5 | 9.5 | 9.5 | 8.5 | | |
| Observations at: | | | | | | | | |
| 10 minutes | | Liquid | Liquid | Liquid | Liquid | Gel | Paste | Liquid |
| 30 minutes | Thin liquid | | | | | | Paste | Liquid |
| 35 minutes | | Gel | Liquid | Gel | Liquid | Gel | Paste | Liquid |
| End of aging process | Firm gel | Hard Gel | Hard Gel | Hard Gel | Soft Elastic Gel | Soft Elastic Gel | Crumbly Paste | Very Weak Gel |
| Aging Time (h) | 16 | 80 | 80 | 80 | 80 | 80 | 16 | 16 |
| Hardness (gram-force) at depth of: | | | | | | | | |
| 20 mm | 42 | 324 | 1008 | 3374 | 9 | 5 | 20 | 1 |
| 25 mm | 36 | 1022 | 1149 | 5000 | 11 | 3 | 19 | 2 |
| 30 mm | 40 | 857 | 1265 | Off-scale | 14 | 3 | 18 | 2 |

Samples 1-4, each produced with quebracho extract, resulted in a good gel or a hard gel after the aging process. Comparing Sample 1 to Sample 2, a harder gel was formed when the amount of crosslinking agent was doubled; a similar conclusion may be drawn by comparing Sample 3 to Sample 4. Comparing Samples 1 to Sample 2, and Sample 2 to Sample 4, increasing the amount of gelling agent relative to the amount of water (constant at 10 mL), a harder gel was formed by using less water relative to the gelling agent. Additionally, Samples 1-6, gels produced from lignosulfonate and quebracho extract, are comparable to or harder than gels produced using a dichromate crosslinking agent.

Samples 7-9 were prepared from drilling starch. Sample 10 was prepared from a difunctional amine (JEFFAMINE® D230, a polyoxyalkyleneamine available from Huntsman). These gelling agents were crosslinked with EGDGE, aged, and analyzed in a manner similar to that described above for Samples 1-6.

crosslinked with EGDGE. Further, Samples 7-9 illustrate the use of an effective pH buffer, as the sample without the trisodium EDTA buffer did not gel.

Example 2

Table 3 details an aqueous gel formulated to illustrate the effect of increasing the concentration of the gelling agent. These samples were prepared from a lignosulfonate (Lignotech D1834) gelling agents crosslinked using EGDGE, as detailed in Table 3. The amount of lignosulfonate given in Table 3 for each respective sample was mixed with 50 mL water and the EGDGE. The pH of the mixture was adjusted to the desired level using sodium hydroxide. The components, apart from the STARCARB, were mixed on a low shear paddle mixer until homogeneous for approximately 15 to 30 minutes. The viscosities were then measured on the viscometer after a period of sixty seconds in order to make measure-

TABLE 2

| | Sample | | | |
|---|---|---|---|---|
| | 7 | 8 | 9 | 10 |
| Gelling Agent: | | | | |
| Drilling Starch | 0.7 | 0.7 | 0.7 | — |
| Jeffamine D230 | — | — | — | 2.0 |
| Cross Linking Agent: | | | | |
| EGDGE | 1.0 | 1.0 | 1.0 | 3.0 |
| pH | 10.0 (Adjusted with caustic) | 10.0 (Adjusted with 0.5 g Trisodium EDTA/Caustic) | 10.0 (Adjusted with 1.0 g Trisodium EDTA/Caustic) | 11 (Unadjusted) |
| Observations at: | | | | |
| 10 minutes | Liquid | Liquid | Liquid | Liquid |
| 25 minutes | Liquid | — | — | Gel |
| 1 hour 30 minutes | Liquid | Soft Gel | Soft Gel | Gel |
| End of aging process | Liquid (pH 8.1) | Soft Gel | Soft Gel | Firm Gel |
| Aging Time (h) | 20 | 20 | 20 | 16 |
| Hardness (gram-force) at depth of: | | | | |
| 20 mm | — | 9 | 14 | 111 |
| 25 mm | — | 11.8 | 18 | 60 |
| 30 mm | — | 48.2 | 18 | 72 |

Samples 7-10 demonstrate that pregelatinized starch, and di- and tri-functional amine based materials may also be ments more consistent by giving the spindle time to release entrapped air bubbles that can cause interference.

TABLE 3

| | | | 6.2% w/w Gelling Agent | | 11.7% w/w Gelling Agent | | 16.6% % w/w Gelling Agent | |
|---|---|---|---|---|---|---|---|---|
| Product | Function | SG | Quantity (mL) | Wt % comp | Quantity (mL) | Wt % comp | Quantity (mL) | Wt % comp |
| Water | Solvent/liquid phase | 1 | 50.0 | 44.6% | 50.0 | 42.0% | 50.0 | 39.6% |
| Degussa Aerosil 200 | Fumed silica viscosifier, suspending, and reinforcing agent | 3 | 0.2 | 0.6% | 0.2 | 0.6% | 0.2 | 0.5% |
| Lignotech D1834 | Lignosulphonate gelling agent | 1.15 | 6.1 | 6.2% | 12.2 | 11.7% | 18.3 | 16.6% |
| STARCARB | Calcium Carbonate bridging solids/ weighting agent | 2.7 | 17.6 | 42.4% | 17.6 | 39.9% | 17.6 | 37.7% |

TABLE 3-continued

| Product | Function | SG | 6.2% w/w Gelling Agent | | 11.7% w/w Gelling Agent | | 16.6% % w/w Gelling Agent | |
|---|---|---|---|---|---|---|---|---|
| | | | Quantity (mL) | Wt % comp | Quantity (mL) | Wt % comp | Quantity (mL) | Wt % comp |
| CVC EGDGE | Crosslinking Agent | 1 | 3.7 | 3.3% | 3.7 | 3.1% | 3.7 | 2.9% |
| Huntsman XGJ502 | Polyetheramine co-gelling agent | 1 | 3.2 | 2.9% | 3.2 | 2.7% | 3.2 | 2.5% |
| TOTALS | | | 80.8 | 100% | 86.9 | 100% | 93.0 | 100% |
| pH | | | 11.6 | | 11.4 | | 11.3 | |

The viscosity was measured using a Brookfield DV–II+ Viscometer using spindle LV2 at 60 rpm at 20° C. Table 4 details the resulting viscosity for the 6.2, 11.7 and 16.6% w/w gelling agent samples.

TABLE 4

| Sample | Viscosity (Cps) |
|---|---|
| 6.2% w/w Gelling Agent | 8.5 |
| 11.7% w/w Gelling Agent | 32.0 |
| 16.6% w/w Gelling Agent | 166.0 |

The results in Table 4 illustrate that the viscosity of the aqueous gel increases as more gelling agent is added to the mixture.

Table 5 details the viscosity results when STARCARB is added to the formulations of Table 3.

TABLE 5

| | Viscosity (Cps) | | | | Hardness (g) | |
|---|---|---|---|---|---|---|
| Sample | 12 RPM | 6 RPM | 0.6 RPM | 0.3 RPM | Initial Hardness | Bulk Range |
| 6.2% w/w Gelling Agent | 80 | 90 | NR* | NR* | 4 | |
| 11.7% w/w Gelling Agent | 665 | 1090 | 5800 | 11800 | 364 | 355-571 |
| 16.6% w/w Gelling Agent | 1400 | 1700 | 5000 | 7400 | 869 | 819-1531 |

*The viscosities were too low to accurately measure at low speeds, a consequence of the low viscosity was the bridging solids settling out of the mixture The results in Table 5 illustrate the importance of having sufficient viscosity to suspend any solids present in the composition. At viscosities lower than approximately 500 centipoise measured at 20° C. at low rotational speeds, the solids settle out of the composition. Further, increasing the amount of gelling agent, which increases the viscosity of the composition, contributes to strong gels. Thus, it is desirable to add sufficient gelling agents to produce a gel composition with an initial viscosity of at least 500 centipoise measured at 20° C. using an LV2 spindle at low rotational speeds (12 rpm or less).

Advantageously, embodiments disclosed herein provide for the formation of a lignin, lignosulfonate, tannin, or tannic acid based gel formed using low or non-toxic crosslinking agents. These gels have the benefit of being formed from materials that provide a better health, safety, and environmental profile as compared dichromates, aldehydes, and epichlorohydrins. The crosslinking agents disclosed herein may also provide a low-cost alternative for the formation of desired gels.

Embodiments of the gels disclosed herein may form a soft elastic gel. Other embodiments of the gels disclosed herein may form a hard gel. In particular embodiments, the gels disclosed herein may be of equivalent or greater hardness than lignin or lignosulfonate gels formed from dichromates.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All priority documents are herein fully incorporated by reference for all jurisdictions in which such incorporation is permitted. Further, all documents cited herein, including testing procedures, are herein fully incorporated by reference for all jurisdictions in which such incorporation is permitted to the extent such disclosure is consistent with the description of the present invention.

What is claimed:

1. A process for strengthening a well bore, comprising:
   injecting a gelling agent into an earthen formation;
   injecting a crosslinking agent into the earthen formation; and
   reacting the gelling agent and the crosslinking agent to form a gel;
   wherein the gelling agent comprises at least one of a lignin, a lignosulfonate, a tannin, a tannic acid, a modified lignin, a modified lignosulfonate, a modified tannin, a modified tannic acid, polyacrylates, polyacrylamides, polyetheramines, polyvinyl amines, and combinations thereof;
   wherein the crosslinking agent comprises at least one of ethylene glycol diglycidyl ether, propylene glycol diglycidyl ether, butylene glycol diglycidyl ether, trimethylolpropane triglycidyl ether, sorbitol polyglycidyl ether, diglycidyl ether of neopentyl glycol, epoxidized 1,6-hexanediol, aziridine derivatives, trimethylolpropane tris(beta-ethyleniminopropionate), epoxy functionalized polyalkylene glycols, and combinations thereof; and
   wherein the weight percent of the gelling agent relative to the total weight of the gel ranges from 11 to 25 weight percent.

2. The process of claim 1, wherein the gelling agent and the crosslinking agent are injected simultaneously.

3. The process of claim 1, wherein the gelling agent and the crosslinking agent are injected sequentially.

4. The process of claim 1, further comprising injecting an alkali metal hydroxide into the earth formation.

5. A method of treating an earth formation comprising:

injecting an aqueous gel comprising at least one gelling agent and at least one crosslinking agent in an aqueous solution in the earth formation, wherein the aqueous gel has an initial viscosity in the range of approximately 500 centipoise to 100,000 centipoise measured at 20°C. using an LV2 spindle at a rotational speed of 12 rpm or less; and allowing the aqueous gel to react in the earth formation to have a hardness of 300 gram force or greater at a penetration depth of 20 mm, wherein the crosslinking agent comprises at least one of ethylene glycol diglycidyl ether, propylene glycol diglycidyl ether, butylene glycol diglycidyl ether, trimethylolpropane triglycidyl ether, sorbitol polyglycidyl ether, diglycidyl ether of neopentyl glycol, epoxidized 1,6-hexanediol, aziridine derivatives, trimethylolpropane tris(beta-ethyleniminopropionate), epoxy functionalized polyalkylene glycols, and combinations thereof, wherein the gelling agent comprises at least one of a lignin, a lignosulfonate, a tannin, a tannic acid, a modified lignin, a modified lignosulfonate, a modified tannin, a modified tannic acid, polyacrylates, polyacrylamides, alkoxylated amines, glycol amines, polyvinyl amines, and combinations thereof, and wherein the combined weight percent of the gelling agents and crosslinking agents relative to the total weight of water in the solution may range from 5 to 100 weight percent.

6. The method of claim 5, further comprising preparing the aqueous gel.

7. The method of claim 5, wherein the combined weight percent of the gelling agents and crosslinking agents relative to the total weight of water in the solution may range from 20 to 70 weight percent.

8. The method of claim 5, wherein the combined weight percent of the gelling agents and crosslinking agents relative to the total weight of water in the solution may range from 25 to 65 weight percent.

* * * * *